US006445081B1

(12) United States Patent
Franz

(10) Patent No.: US 6,445,081 B1
(45) Date of Patent: Sep. 3, 2002

(54) LOCKING ARRANGEMENT, IN PARTICULAR FOR VEHICLES

(75) Inventor: Erhard Franz, Rödermark (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/383,850

(22) Filed: Aug. 26, 1999

(30) Foreign Application Priority Data

Sep. 1, 1998 (DE) ........................................ 198 39 707

(51) Int. Cl.[7] .................................................. B60L 1/00

(52) U.S. Cl. ....................................... 307/10.1; 307/9.1

(58) Field of Search ................................ 307/10.1, 9.1; 292/336.3, 201, 23 D, 42 D, 43 D; 200/61.62, 61.64

(56) References Cited

U.S. PATENT DOCUMENTS

| | | | | |
|---|---|---|---|---|
| 3,995,201 A | * | 11/1976 | Allardice, Jr. | 317/99 |
| 4,144,555 A | * | 3/1979 | McGilliard | 361/386 |
| 4,270,783 A | * | 6/1981 | Sorensen et al. | 292/336.3 |
| 5,240,296 A | | 8/1993 | Kobayashi | |
| 5,273,324 A | * | 12/1993 | Kobayashi | 292/201 |
| 5,308,129 A | * | 5/1994 | Hlavaty | 292/216 |
| 5,359,884 A | * | 11/1994 | Fey et al. | 73/118.1 |
| 5,937,584 A | * | 8/1999 | Salmonowicz et al. | 49/502 |

FOREIGN PATENT DOCUMENTS

| | | | | |
|---|---|---|---|---|
| DE | 195 24 232 A1 | * | 7/1995 | B60J/5/04 |
| DE | 4444048 | | 5/1996 | |
| EP | 0 637 521 A1 | * | 2/1995 | B60J/5/04 |
| JP | 02068824 A1 | * | 3/1990 | H01H/21/50 |

OTHER PUBLICATIONS

1996–252476—English Abstract of DE 195 24 232 cited above Published May 23, 1996.*

1990–119210—English Abstract of JP02068824 cited above Published Mar. 8, 1990.*

* cited by examiner

*Primary Examiner*—Kim Huynh
*Assistant Examiner*—Sharon Polk
(74) *Attorney, Agent, or Firm*—Martin A. Farber

(57) ABSTRACT

A locking arrangement, in particular for a vehicle, having an actuator driving a functional element and intended for setting various functional positions, and a position-detecting device, in particular a potentiometer for detecting the position of the functional element. The positioning-detecting device is formed as a preassembled unit, wherein this unit can be connected to the functional element via a connector.

9 Claims, 4 Drawing Sheets

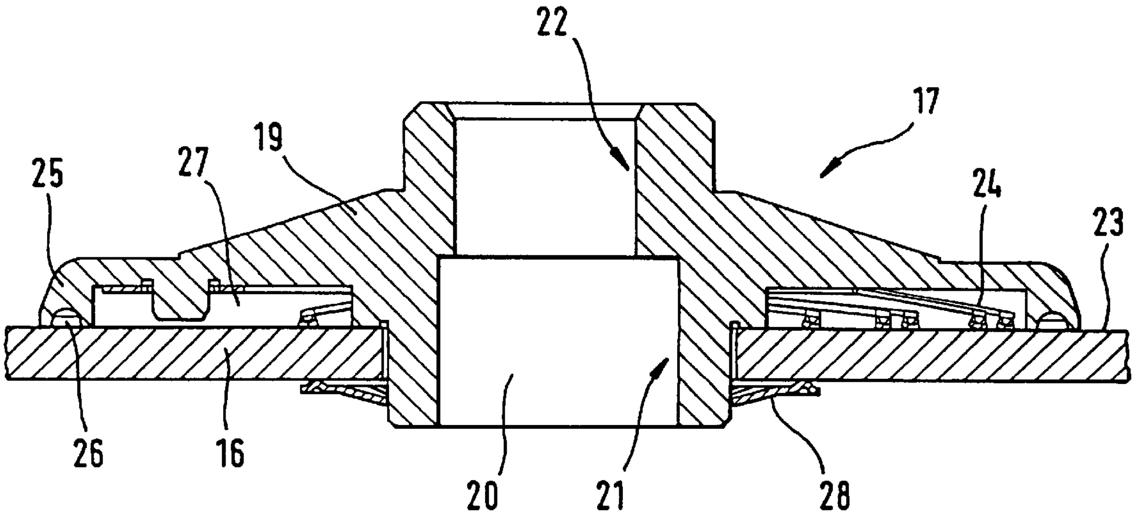
Fig. 3
Fig. 4
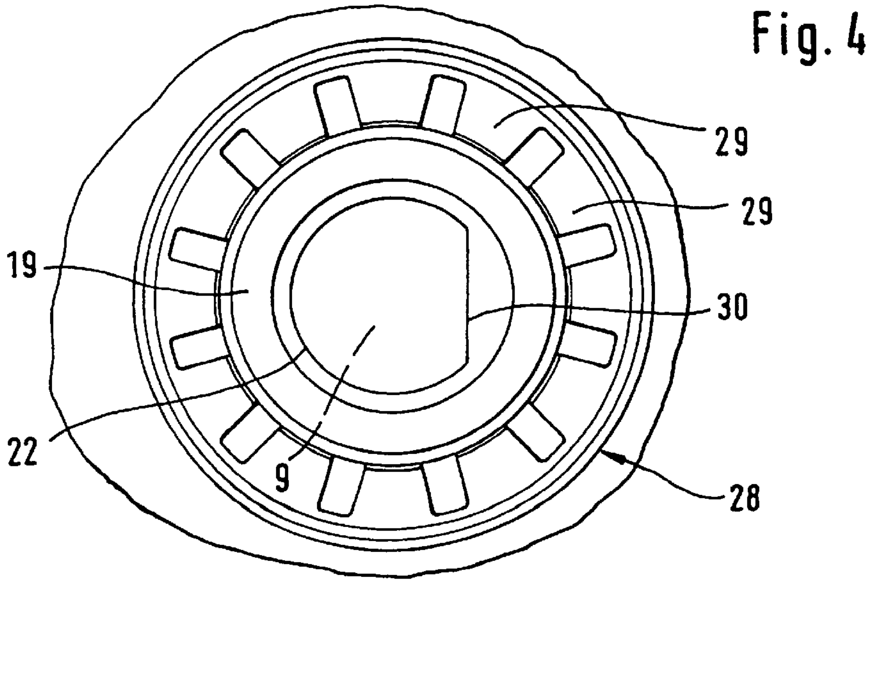

LOCKING ARRANGEMENT, IN PARTICULAR FOR VEHICLES

FIELD AND BACKGROUND OF THE INVENTION

The invention relates to a locking arrangement, in particular for a vehicle to the features of the preamble of patent.

U. S. Pat. No. 5,240,296 discloses a locking arrangement, in particular for a vehicle, an actuator which drives a functional element being provided, in which case various functional positions of the locking arrangement can be set by means of this functional element. These functional positions concern the function "secured against theft", in which a door of the vehicle can be opened neither by the door exterior handle nor by the door interior handle. Further functional positions which may be mentioned are "unlocked" and "locked", in which case, in the functional position "unlocked", the door may be opened by both the door exterior handle and the door interior handle, whereas, in the functional position "locked"(also called "centrally locked"), the door may be opened via the door interior handle, so that the occupants of the vehicle may leave the latter, but the door cannot be opened by the door exterior handle, so that access from outside to the vehicle is not possible in this functional position.

The functional element, which in the USA patent is designed as an actuating lever, is moved between various positions by the actuator. A plurality of position-detecting devices, which are designed as potentiometers, are required in order to detect these positions and to control the actuator. The wiper path of the potentiometer are either applied to the inside in the housing of the locking arrangement or are located on a worm gear, which is driven by the actuator. The wipers assigned to the wiper paths sit on the actuating element, the wiper paths being arranged in electric circuits.

It has been found that, although the position-detecting device, which is realized as a potentiometer, works satisfactorily, the construction of the locking arrangement is unsatisfactory, since various parts (functional elements such as worm gear and actuating lever) as well as the housing of the locking arrangement have to be provided with the conductor paths, in which case it is not possible to check the electrical service ability of these elements until after the assembly of the entire locking arrangement. Should it be found at the same time that there are faults in the electrical circuitry or in the position-detecting device, the entire locking arrangement is unserviceable and either cannot be used or requires extensive testing and if need be has to be repaired.

SUMMARY OF THE INVENTION

The object of the invention is therefore to provide a locking arrangement described at the beginning, in particular for a vehicle, which locking arrangement is simple to assemble and in which faults in the electrical circuitry or in the position-detecting device do not lead to a failure of the entire locking arrangement. In addition, the position-detecting device is to be easy to exchange.

According to the invention, provision is made for the position-detecting device, in particular a potentiometer, to be formed as a preassembled unit, in which case this unit can be connected to the functional element via connecting means. This has the advantage that the position-detecting device, designed as a preassembled unit, can be electrically tested after its assembly and the serviceability can be established. Only such units which are satisfactory are therefore installed in the locking arrangement. Defective units may be rejected, or may be repaired in order to be subsequently used again.

The ease of assembly is increased owing to the fact that the preassembled unit can be connected to the functional element via connecting means, as a result of which, on the one hand, relative positional orientation between the preassembled unit and the functional element of the locking arrangement is ensured and, on the other hand, tolerances can be compensated for via the connecting means.

Due to the connecting means, it is now also possible, in the event of a mechanical defect of the locking arrangement (for example a defect at the functional element) or in the event of an electrical defect (at the position-detecting device), to exchange the defective component and replace it with a new one. On account of this clearly defined separation of mechanical system and electric/electronic system, it also easy to detect where the fault lies. The correspondingly defective component may then be exchanged quickly and simply.

In a development of the invention, the unit designed as a potentiometer is arranged on a printed circuit board and is held on the printed circuit board by a lock washer. The connection from the position-detecting device to, for example, an analyzing circuit can be made simply and quickly via the printed circuit board, in which case other components may also be arranged on the printed circuit board or may be suitable for connection to the latter. In an especially advantageous manner, the printed circuit board with the potentiometer locked thereto is accommodated in a housing and may thus be oriented in the correct position. The preassembly of the potentiometer on the printed circuit board and the locking with the lock washer has the advantage that the conductor paths on the printed circuit board are held in a fixed position, while the wipers of the potentiometer can rotate about these conductor paths. The use of a linear potentiometer, in which the wipers are moved linearly over the conductor paths on the printed circuit board, is of course not ruled out at this point.

In a development of the invention, the potentiometer and the functional element are arranged on a common shaft. Thus both the mounting for the potentiometer and the functional element as well as the transmission of the movement of the functional element to the potentionmeter by the actuator are combined in the narrowest space, so that a compact type of construction is thereby obtained.

In a development of the invention, a support body of the potentiometer has recesses for accommodating fingers arranged on the functional element, or vice versa. When the support body is being mounted onto the functional element, these fingers engage in the recesses of the functional element (or vice versa), so that, on the one hand, this form grip provides for the force transmission from the functional element to the support body of the potentiometer. This causes the support body of the potentiometer to follow the movements of the functional element and ensures that such an output signal of the potentiometer which represents the position of the functional element is always available. On the other hand, the configuration of fingers/recesses has the advantage that, as a result, there is a defined position and a clearly defined orientation between the support body of the potentiometer and the functional element. This is in particular of importance when the configuration of the recesses and the fingers only permits a single relative position between the support body of the potentiometer and the functional element, so that setting-up work with regard to the position of the support body of the potentiometer relative to the functional element or vice versa may be omitted.

In a development of the invention, the recesses have a smaller depth than the length of the fingers. This means that the fingers cannot engage in their entirety in the recesses, so that there is always a section of the fingers which is not enclosed by the recesses after assembly. This has the advantage that, on account of the geometric construction and possibly depending on the materials used, such as plastic for example, tolerance compensation between the position of the support body of the potentiometer and the functional element is possible. This tolerance compensation occurs on account of slight elasticity of the fingers. In addition, there is also the advantage that temperature fluctuations are compensated for with this geometric construction, a factor which is especially important when said elements are accommodated in a housing of the locking arrangement.

In a development of the invention, the support body of the potentiometer has a bore having a smaller diameter, which is slightly larger than the outside diameter of the shaft. The functional element may thus be mounted on the shaft, whereas the support body is rotatably mounted not on the shaft but on the printed circuit board. As a result, a rigid coupling between the support body of the potentiometer and the functional element is avoided, so that slight movements of the elements are possible in order to be able to compensate for tolerances and possibly also for material expansions and material contractions on account of temperature changes while maintaining the serviceability. Reference is made to the figures for the further configuration of this construction.

In a development of the invention, a coupling defining and securing the relative position between the support body of the potentiometer and the functional element is arranged as connecting means between the support body of the potentiometer and the functional element. This means that the connecting elements have to be arranged not only on the support body and/or the functional element, so that it is conceivable for a coupling to be inserted between the support body and the functional element, which coupling transmits the movement of the functional element to the support body and defines and secures a relative position between the support body and the functional element. Thus, for example, the support body and the functional element may have fingers directed toward one another, while the coupling is provided with correspondingly shaped recesses. With regard to the configuration of such a coupling, reference is also made to the fact that here, too, the recesses may have a smaller depth than the length of the fingers. The advantages described and resulting therefrom apply here in the same manner. Such a coupling may be used, for example, when larger distances have to be bridged between the support body and the functional element.

In a development of the invention, the shaft has a flat, a longitudinal groove, a longitudinal web or the like, which corresponds with a flat, a longitudinal web, a longitudinal groove or the like in the support body of the potentiometer and in the functional element. The relative position between the support body and the functional element is thus also secured in a clearly defined manner, in which case the support body can follow the movements of the functional element here too, and the potentiometer can deliver an output signal representing the position of the functional element.

Features which relate to the assembly of the locking arrangement and which are therefore of advantage with regard to the ease of assembly are provided in the provided.

BRIEF DESCRIPTION OF THE DRAWINGS

A configuration of a locking arrangement according to the invention, which, however, is not restricted to the present invention and can be extended to other uses without departing from the scope of the invention, is described below and is explained with reference to the figures, of the drawings, in which:

FIG. 3 shows the construction of a potentiometer, FIG. 4 shows a lock washer.

DETAILED DESCRIPTION OF THE PREFERRED EMBODIMENTS

Figure 1:
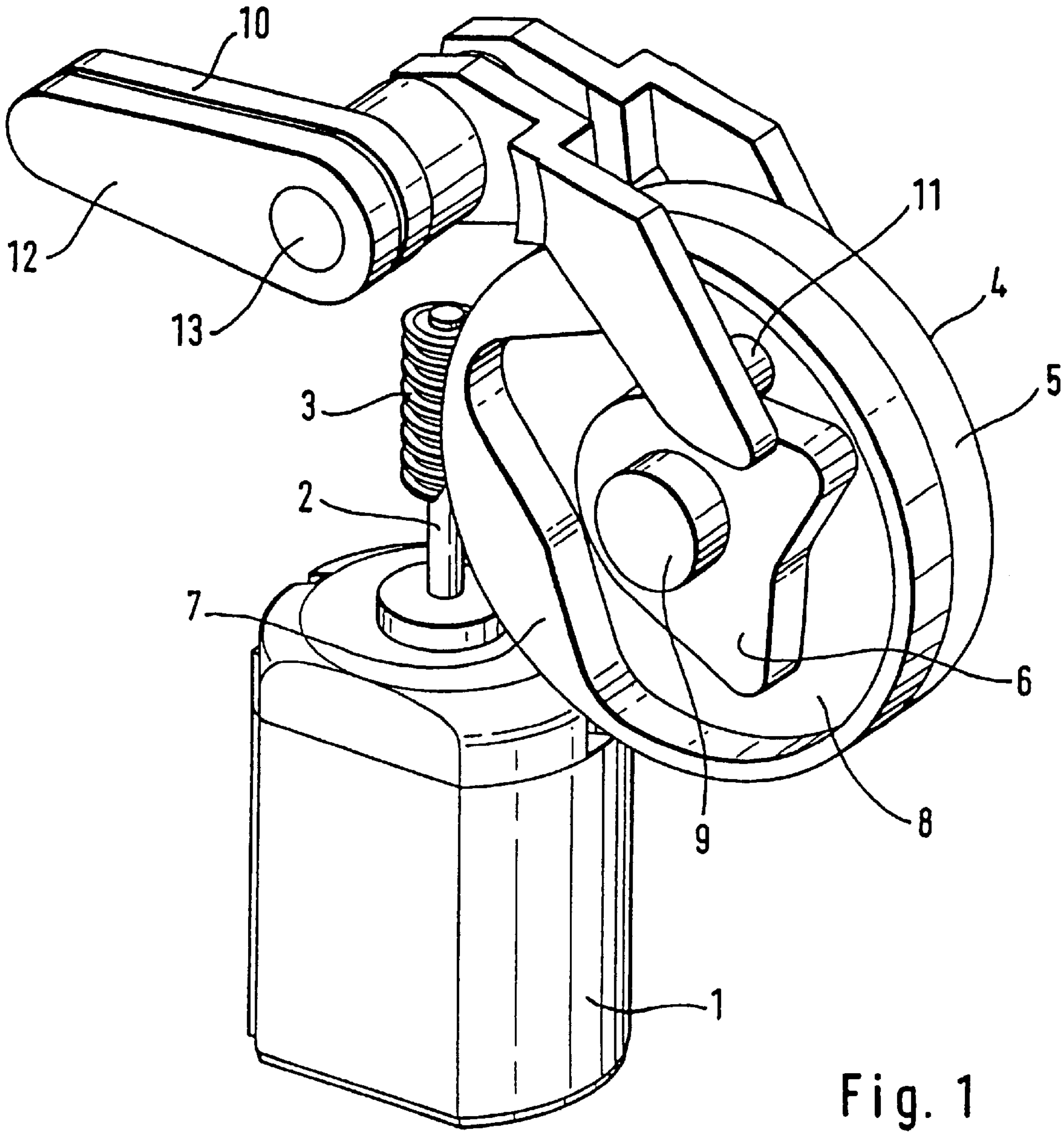
FIG. 1 shows the construction of a locking arrangement.

FIG. 1 shows an electrically actuable locking arrangement with an actuator, which is designed as an electric motor 1. A worm gear 3 sits on a shaft 2 of the electric motor 1, a transmission element designed as a control disk 4 being driven by the electric motor 1. An outer circumference 5 of the control disk 4 is provided with teeth (not shown in FIG. 1), which mesh with the worm gear 3 and thus form a reduction gear unit. At least one side of the control disk 4 has inner prominences 6 and outer prominences 7, which form an intermediate region. The inner and outer prominences 6, 7 form a contour profile for setting various functions of the locking arrangement, as will be described later.

The control disk 4 is rotatably mounted on shaft 9. Designated by the reference numeral 10 is a first lever, whose end assigned to the control disk 4 carries a pin 11, which projects into the intermediate region 8 and can come to bear against the contours of the inner prominences 6 and outer prominences 7. Furthermore, a second lever 12 is also shown in FIG. 1, and this second lever 12 is mounted with the first lever 10 on a common shaft 13 and can be set independently of the first lever 10 by means of inner prominences and outer prominences on the other side of the control disk 4. At this point it may be mentioned that, with the embodiment shown in FIG. 1, the actuation of the door interior handle and the door exterior handle may or may not be transmitted to lock elements, such as a ratchet/rotary catch for example, as a function of the positions of the levers 10 and 12. It is also conceivable to assign to an individual grip (such as the door interior handle for example) a separate electric motor 1 having a separate control disk 4 and inner prominences 6 and outer prominences 7 on only one side and also only a single lever. Since the design of the lock elements does not affect the configuration of the actuator, an illustration has been dispensed with. For clarification it may be mentioned that a grip is connected via Bowden cables to a further lever, this further lever being actuable, for example, by the first lever 10. The further lever acts on lock elements, such as, for example, on the ratchet interacting with a rotary catch. In its one position, the first lever 10 then enables the further lever to act on the ratchet during actuation of the grip, whereas in its further position the first lever 10 acts on the further lever in such a way that the actuation of the grip cannot act on the ratchet (idle stroke).

This embodiment shown in FIG. 1 therefore permits an extremely flat type of construction, which permits all the functions of an electrically actuable locking arrangement, such as "unlocking", "(central) locking" and "anti-theft security" (if need be, also "childproof locking"). By corresponding actuation of the electric motor 1 and the movement of the levers 10 and 12 as a function of the contours of the control disk 4, the lock functions for two grips (such as, for example, door interior and exterior handles) are realized with only one actuator (electric motor 1).

Figure 2:
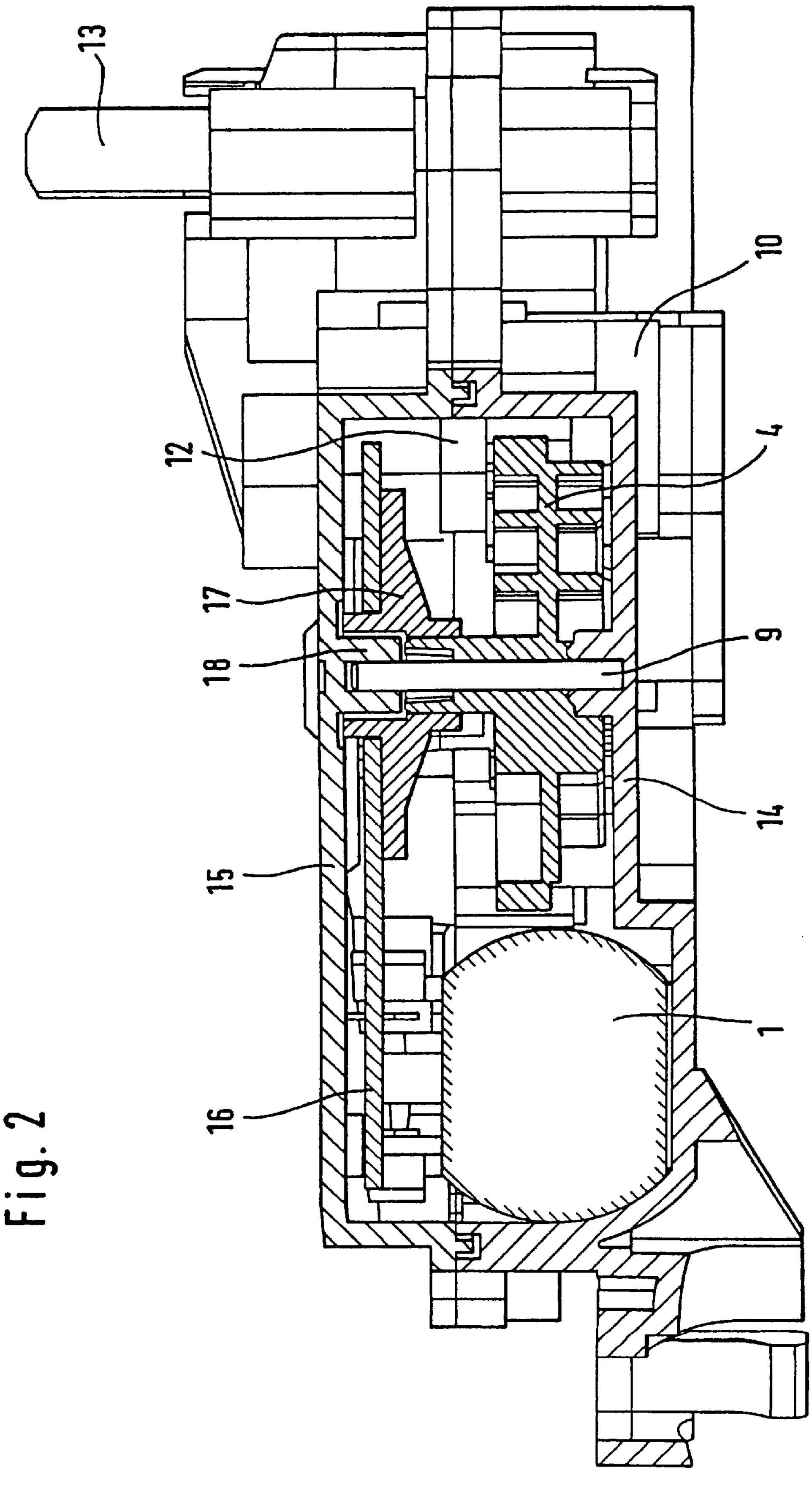
FIG. 2 shows the accommodation of the elements shown in FIG. 1 in a housing.

FIG. 2 shows how the elements shown in FIG. 1 and provided with the same reference numerals are accommodated in a housing 14 of the locking arrangement. The housing 14 has a housing lid 15, the housing lid 15 covering the housing 14 in a dampproof and dustproof manner by means of a seal (not shown and not numbered).

A printed circuit board 16 is inserted into the housing 14, for which purpose appropriate means (such as, for example, pins or the like) are provided either on the housing 14 or the housing lid 15 or on both in order to hold the printed circuit board 16. Thus the printed circuit board 16 is inserted for example, into corresponding recessed portions or the printed circuit board 16 has holes with which it is guided via pins in the housing 14, corresponding mating pins, which fix the printed circuit board 16 in its position, being provided in the housing lid 15. However, the printed circuit board 16 may also be attached to the housing 14 or the housing lid 15 by adhesive bonding, screwing or the like.

Furthermore, a position-detecting device in the form of a potentiometer 17 is arranged in the housing 14 on the printed circuit board 16. Instead of the potentiometer 17, which delivers a continuous signal in accordance with the position of the control disk 4, or to complement the potentiometer 17, a position-detecting device which produces discontinuous ouput signals may also be arranged, so that, for example, signals can be delivered in certain positions of the control disk 4 and no output signals are produced in positional ranges in between (or vice versa).

One end of the shaft 9 is secured in the housing 14 and is inserted in a rotationally locked manner into a corresponding receptacle or is already introduced at the manufacturing stage of the housing 14. After assembly of the control disk 4 and the potentiometer 17, a receptacle 18 in the housing lid 15 encloses the shaft 9, so that this shaft 9 is mounted in a rotationally locked manner at its two ends, and the control disk 4 and the potentiometer 17 can move about this shaft 9.

The position-detecting device designed as a preassembled unit and in the form of the potentiometer 17 is shown in section in FIG. 3. The potentiometer 17 has a support body 19, which is provided with a stepped bore 20. This bore 20 has a large diameter 21 and a small diameter 22. In this case, the large diameter 21 is selected in such a way that the receptacle 18 can be accommodated without touching. The small diameter 22 is selected in such a way that it either corresponds to the outside diameter of the shaft 9 or is larger than the outside diameter of the shaft 9, so that there is still space in the intermediate region.

Arranged on a surface 23 of the printed circuit board 16 concentrically around the bore 20 are conductor paths (and if need be contact paths), which are scanned by wipers (not designated), which are fastened to wiper carriers 24 of the support body 19.

On its outer circumference, the support body 19 has a web 25, which is provided with a groove 26 directed toward the surface 23, in which case a seal or a sealing means can be put into the groove 26 in order to form a space 27, which is enclosed by the support body 19 and in which the conductor paths (and if need be contact paths) as well as the wipers on the wiper carriers 24 are arranged. This sealing isolation of the space 27 has the advantage that the paths and the wipers cannot be contaminated and are protected especially from moisture, which could lead to corrosion.

The support body 19, in the region of the bore 20, is inserted with an encircling ring (not designated in any more detail) into an aperture, in particular a hole, in the printed circuit board 16, the support body, after the insertion, being held on the printed circuit board 16 by a lock washer 28. The printed circuit board 16 with the potentiometer 17 described is therefore a preassembled construction unit, which may be checked for its serviceability beforehand, that is before insertion into the housing 14 of the locking arrangement.

The lock washer 28 from FIG. 3 is shown in detail in FIG. 4. This lock washer 28 has fingers 29, which, starting from its outer circumference, are directed inward and are movable independently of one another, those ends of the fingers 29 which are directed inward being supported on the outer ring of the support body 19 and thus holding the support body 19 on the printed circuit board 16 in an elastic manner. As a result, the support body 19 is secured to the printed circuit board 16 in such a way as to be rotatable but no longer axially movable. Shown in the center of the lock washer 28 is the shaft 9, which has a flat 30, provision being made in a design differing from FIG. 2 for there also to be a flat on the functional element (control disk 4) and the support body 19 of the potentiometer 17, this flat corresponding to the flat 30 of the shaft 9, so that, via the flats assigned to one another, the movement of the control disk 4 is transmitted to the support body 19 and the potentiometer 17 delivers an output signal corresponding to the position of the control disk 4. This output signal may be analyzed, for example, by an electronic module, likewise arranged on the printed circuit board 16 and carrying an analyzing circuit, and be made available for further processing.

Figure 5:
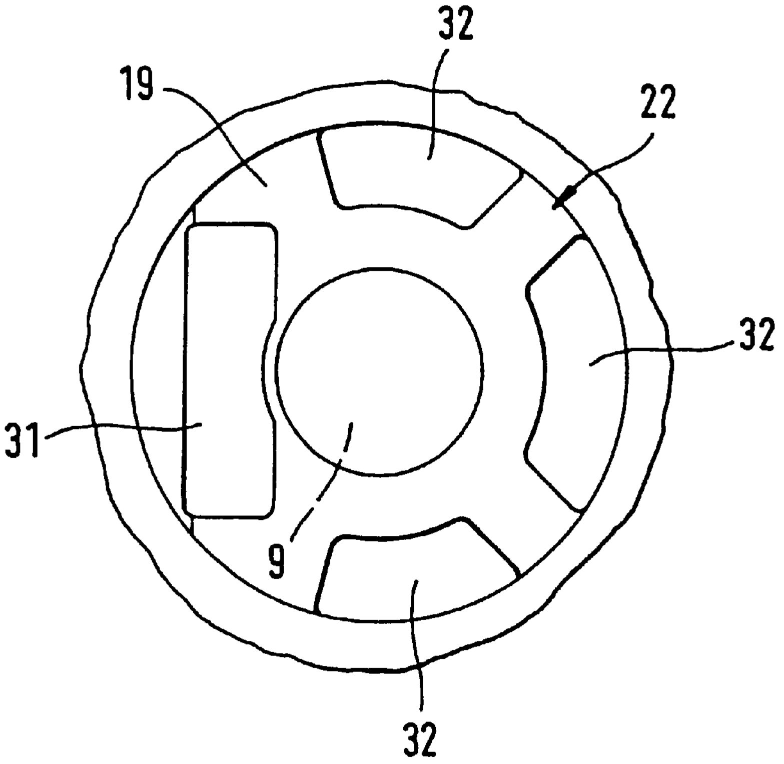
FIG. 5 shows recesses in a support body of the potentiometer.
Figure 6:
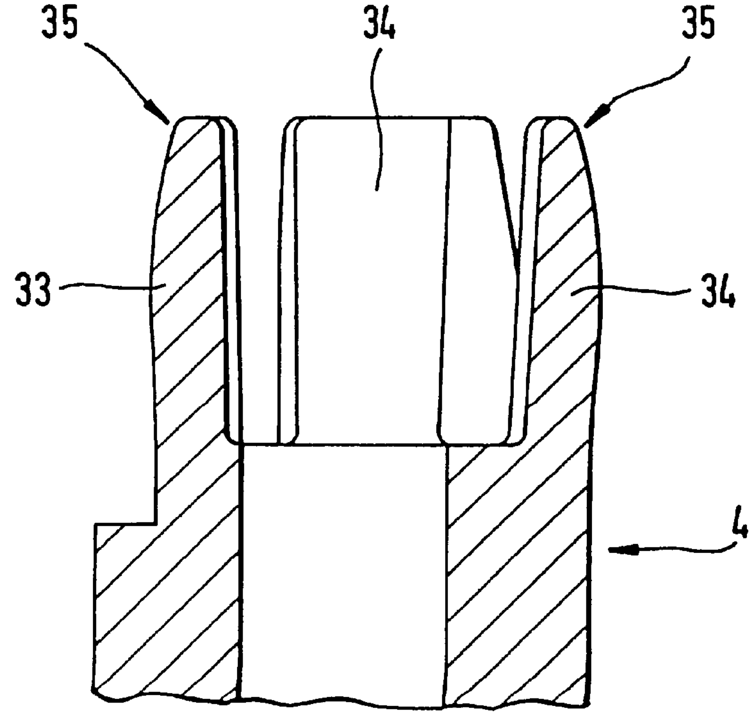
FIG. 6 shows fingers on the function element.

In a construction as illustrated in FIGS. 2 and 3 already described and in FIGS. 5 and 6 still to be described the flat 30 of the shaft 9 may be omitted.

The connecting means on the support body 19 and the control disk 4 are shown in FIGS. 5 and 6.

In FIG. 5 it is shown that the support body 19 has recesses of different shape in its surface pointing in the direction of the control disk 4, in which case there is a flat recess 31 and a plurality of curved recesses 32. These recesses 31 and 32 are arranged in the region of the small diameter 22. In this case, the small diameter 22 is equal to the outside diameter of the shaft 9.

Shown in FIG. 6 are the connecting means on the control disk 4, a plurality of fingers being arranged on that end of the control disk 4 which faces the support body 19, in which case there is a flat finger 33 and a plurality of curved fingers 34. The cross section of the fingers 33 and 34 essentially corresponds to the cross section of the recesses 31 and 32. The fingers 33 and 34 have a slight bulbous shape in longitudinal section, so that they are held in a frictional manner in the recesses 31 and 32 after insertion into the latter, in which case slight radial movements with regard to tolerance compensation are still possible. This effect of the tolerance compensation is intensified owing to the fact that the fingers 33 and 34 are not put into the recesses 31 and 32 over their entire length but rather part of the fingers 33 and 34 remain free. The shape of the recesses 31 and 32 and of the fingers 33 and 34 corresponding with them is selected in such a way that there is a clearly defined position of the support body 19 relative to the control disk 4 after assembly.

At their top end, the fingers 33 and 34 also have a flat 35, which thereby permits better insertion of the fingers 33 and 34 into the recesses 31 and 32. On account of the design of the support body 19 and the control disk 4, as shown in FIGS. 5 and 6, these two elements are connected in a clearly defined position relative to one another and the movement of the control disk 4 is transmitted to the support body 19 of the potentiometer 17. During this rotary movement, the support body 19 and the control disk 4 are mounted about the fixed shaft 9, which can thus absorb the forces which occur.

If the connecting means, as already described, are connected as a coupling, both the control disk 4 and the support body 19 may have fingers 33 and 34, the coupling arranged in between being provided with recesses 31 and 32 both in the direction of the support body 19 and in the direction of the control disk 4, in which recesses 31 and 32 the corresponding fingers of the support body 19 and the control disk 4 engage.

A reversed arrangement is of course also possible, so that the support body 19 is provided with the fingers 33 and 34 and the control disk 4 is provided with the recesses 31 and 32. The same applies if the connecting means are designed as a coupling, so that the coupling part then has the fingers.

Whereas the embodiment shown in FIGS. 5 and 6 has the advantage of tolerance compensation and elastic resilience, other connections may also be used if it is a matter of orienting the support body 19 in a clearly defined position relative to the control disk 4. In this case, for example, polygonal push-in connections between the control disk 4 and the support body 19 may be mentioned.

I claim:

1. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein, the potentiometer includes a support body (19) and conductor paths, the unit comprising the potentiometer is arranged on a surface of a printed circuit board (16), which paths are scanned by wipers, the wipers being fastened to wiper carriers (24) of the support body (19), wherein the support body is inserted within an encircling ring into an aperture in the printed circuit board (16), the support body (19), after insertion, being secured to the printed circuit board (16) by a lock washer (28), the lock washer holding the support body (19) on the printed circuit board (16) in an elastic manner and the support body (19) is secured so as to be rotatable but no longer axially movable and therefore the printed circuit board (16) with the support body (19) is a preassembled construction.

2. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein, the potentiometer includes a support body (19) and conductor paths, the unit comprising the potentiometer is arranged on a surface of a printed circuit board (16), which paths are scanned by wipers, the wipers being fastened to wiper carriers (24) of the support body (19), wherein the support body is inserted within an encircling ring into an aperture in the printed circuit board (16), the support body (19), after insertion, being secured to the printed circuit board (16) by a lock washer (28), the lock washer holding the support body (19) on the printed circuit board (16) in an elastic manner and the support body (19) being secured so as to be rotatable but no longer axially movable and therefore the printed circuit board (16) with the support body (19) is a preassembled construction and the potentiometer (17) and the functional element, are formed as a control disk (4) and are arranged on a common shaft (9).

3. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein, the potentiometer includes a support body (19) and conductor paths, the unit comprising the potentiometer is arranged on a surface of a printed circuit board (16), which paths are scanned by wipers, the wipers being fastened to wiper carriers (24) of the support body (19), wherein the support body is inserted within an encircling ring into an aperture in the printed circuit board (16), the support body (19), after insertion, being secured to the printed circuit board (16) by a lock washer (28), the lock washer holding the support body (19) on the printed circuit board (16) in an elastic manner and the support body (19) being secured so as to be rotatable but no longer axially movable and therefore the printed circuit board (16) with the support body (19) is a preassembled construction and a support body (19) of the potentiometer (17) has recesses (31, 32) for accommodating fingers (33, 34) arranged on the functional element.

4. The locking arrangement as claimed in claim 3, wherein the recesses (31, 32) have a smaller depth than a length of the fingers (33, 34).

5. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein, the potentiometer includes a support body (19) and conductor paths, the unit comprising the potentiometer is arranged on a surface of a printed circuit board (16), which paths are scanned by wipers, the wipers being fastened to wiper carriers (24) of the support body (19), wherein the support body is inserted within an encircling ring into an aperture in the printed circuit board (16), the support body (19), after insertion, being secured to the printed circuit board (16) by a lock washer (28), the lock washer holding the support body (19) on the printed circuit board (16) in an elastic manner and the support body (19) being secured so as to be rotatable but no longer axially movable and therefore the printed circuit board (16) with the support body (19) is a preassembled construction and a support body (19) of the potentiometer (17) has a bore (20) having a diameter (22) corresponding to an outside diameter of a shaft (9) into which bore (20) the shaft is inserted, and wherein the support body (19) is moveable about the shaft (9).

6. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein, the potentiometer includes a support body (19) and conductor paths, the unit comprising the potentiometer is arranged on a surface of a printed circuit board (16), which paths are scanned by wipers, the wipers being fastened to wiper carriers (24) of the support body (19), wherein the support body is inserted within an encircling ring into an aperture in the printed circuit board (16), the support body (19), after insertion, being secured to the printed circuit board (16) by a lock washer (28), the lock washer holding the support body (19) on the printed circuit board (16) in an elastic manner and the support body (19) being secured so as to be rotatable but no longer axially movable and therefore the printed circuit board (16) with the support body (19) is a preassembled construction and a coupling defining and securing a relative position between a support body (19) of the potentiometer (17) and the functional element is arranged as connecting means between the support body (19) of the potentiometer (17) and the functional element.

7. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein, the potentiometer includes a support body (19) and conductor paths, the unit comprising the potentiometer is arranged on a surface of a printed circuit board (16), which paths are scanned by wipers, the wipers being fastened to wiper carriers (24) of the support body (19), wherein the support body is inserted within an encircling ring into an aperture in the printed circuit board (16), the support body (19), after insertion, being secured to the printed circuit board (16) by a lock washer (28), the lock washer holding the support body (19) on the printed circuit board (16) in an elastic manner and the support body (19) being secured so as to be rotatable but no longer axially movable and therefore the printed circuit board (16) with the support body (19) is a preassembled construction and a shaft (9) has a flat, a longitudinal groove, a longitudinal web, which corresponds with a flat (30), a longitudinal web, a longitudinal groove in the support body (19) of the potentiometer (17) and in the functional element.

8. A locking arrangement for a vehicle, having an actuator driving a functional element and intended for setting various functional positions of the locking arrangement, and a position-detecting device formed as a potentiometer (17), for detecting the position of the functional element, wherein the position-detecting device is formed as a preassembled unit, which preassembled unit is connected to the functional element via connecting means, wherein a shaft (9) is mounted in a housing (14) and then the functional element and the preassembled unit with the potentiometer (17) are pushed over the shaft (9) such that the functional element is connected to the potentiometer (17) in a relative position between the potentiometer (17) and the functional element.

9. The locking arrangement as claimed in claim 8, wherein the housing (14) is closable by a housing lid (15), the housing lid (15) having a receptacle (18) for the shaft (9).

* * * * *